United States Patent
Struik (10) Patent No.: US 8,549,299 B2
(45) Date of Patent: Oct. 1, 2013

(54) ACCELERATED KEY AGREEMENT WITH ASSISTED COMPUTATIONS

(75) Inventor: Marinus Struik, Toronto (CA)

(73) Assignee: Certicom Corp., Mississauga ( * ) Notice: Subject to any disclaimer, the term of this patent is extended or adjusted under 35 U.S.C. 154(b) by 207 days.

(21) Appl. No.: 13/036,918

(22) Filed: Feb. 28, 2011

(65) Prior Publication Data

US 2012/0221858 A1 Aug. 30, 2012

(51) Int. Cl.
H04L 9/08 (2006.01)
H04L 9/30 (2006.01)

(52) U.S. Cl.
USPC .......................................... 713/171; 380/282

(58) Field of Classification Search
USPC .......... 380/285, 288, 286, 287; 713/171–175
See application file for complete search history.

(56) References Cited

U.S. PATENT DOCUMENTS

| | | | | |
|---|---|---|---|---|
| 5,483,597 A * | 1/1996 | Stern | ................................. | 380/30 |
| 7,024,559 B1 | 4/2006 | Solinas | | |
| 7,257,709 B2 * | 8/2007 | Brown et al. | .................. | 713/171 |
| 7,587,605 B1 * | 9/2009 | Venkatesan et al. | ........... | 713/180 |
| 2003/0059043 A1 * | 3/2003 | Okeya | .............................. | 380/30 |
| 2004/0114760 A1 * | 6/2004 | Brown et al. | .................. | 380/255 |
| 2006/0029222 A1 | 2/2006 | Lambert et al. | | |
| 2006/0036861 A1 * | 2/2006 | Chernyak et al. | .............. | 713/171 |
| 2007/0177721 A1 * | 8/2007 | Itoh et al. | .......................... | 380/28 |
| 2007/0217601 A1 * | 9/2007 | Lambert et al. | .................. | 380/28 |
| 2008/0002721 A1 * | 1/2008 | Greene et al. | .................. | 370/400 |
| 2008/0226083 A1 | 9/2008 | Yi et al. | | |
| 2010/0153728 A1 * | 6/2010 | Brown | ........................... | 713/171 |
| 2010/0195745 A1 * | 8/2010 | Gupta et al. | ................... | 375/257 |
| 2011/0060917 A1 * | 3/2011 | Troncoso Pastoriza et al. | .............................. | 713/189 |
| 2011/0060918 A1 * | 3/2011 | Troncoso Pastoriza et al. | ............................. | 713/189 |

FOREIGN PATENT DOCUMENTS

CA 2592875 A1 7/2006

OTHER PUBLICATIONS

Rostovsev et al , Elliptic Curve Point Multiplication, 2003, Springer-Verlag Berlin Heidelberg 2003, pp. 328-336.*
Darrel Hankerson et al., Guide to Elliptic Curve Cryptography, Springer, p. 75-152, 2004.
A. Antipa et al., Accelerated Verifcation of ECDSA Signatures. Proceedings of Selected Area of Cryptography-SAC 2005, 2006, p. 307-318, vol. 3897, Springer, Berlin.
Christian Horback, European Search Report Regarding EP Application No. 11156334, Aug. 26, 2011, Munich.

(Continued)

*Primary Examiner* — Eleni Shiferaw
*Assistant Examiner* — Abu Sholeman
(74) *Attorney, Agent, or Firm* — Wilfred P. So; John R. S. Orange; Blake, Cassels & Graydon LLP (57) ABSTRACT

A method is provided for obtaining a secret value for use as a key in a cryptographic operation, the secret value combining a private key, x, of one computing device with a public key, Y, of another computing device to obtain a secret value xY. The method includes obtaining a pair of scalars $x_0$, $x_1$ such that $x=x_0+x_1 t$ where t is a scaling factor; obtaining a supplementary public key tY; combining the scalars and the public keys to obtain a representation of the secret value xY as a linear combination of the scalars and the public keys; and utilising the secret value as a key in a cryptographic operation performed by the one computing device.

24 Claims, 6 Drawing Sheets

(56) References Cited

OTHER PUBLICATIONS

FIPS Pub 186-2, Digital Signature (DSS), Federal Information Processing Standards Publication 186-2, US Department of Commerce/National Institute of Standards and Technology, Gaithersburg, Maryland, USA, Jan. 27, 2000 (Includes change notice, Oct. 5, 2001).

Gallant R. et al, 'Faster Point Multiplication of Elliptic Curves with Efficient Endomorphisms,' in Proceedings of Advances in Cryptology—CRYPTO 2001. Lecture Notes in Computer Science, vol. 2139, pp. 190-200, 2001.

Menezes R.J. et al., Handbook of Applied Cryptography, CRC Press, pp. 517, § 12.51, 1997.

Engel, Lawrence J., International Search Report from corresponding PCT application No. PCT/CA2012/050113; Search completed Jun. 20, 2012.

* cited by examiner

ACCELERATED KEY AGREEMENT WITH ASSISTED COMPUTATIONS

TECHNICAL FIELD

The following relates generally to the field of cryptography and has particular utility in performing key agreement between parties in a cryptographic system.

BACKGROUND

As communications have progressed into the electronic domain, information has become easy to copy and disseminate. The prevalence of electronic communication has made for many productivity advances, and an increase in knowledge and information sharing. However, due to the ease of dissemination, there is an ever increasing need for privacy and authentication in electronic communications.

To retain privacy, the method of encrypting data using a key is very well known. In a symmetric key cryptographic protocol, correspondents share a common secret key. This key must be agreed upon by the parties, with its secrecy maintained throughout the conversation.

Public key cryptographic protocols were first proposed in 1976 by Diffie-Hellman. A public-private key pair is created for each correspondent, with the public key made available to other parties, and the private key information kept to the recipient. Any message encrypted using the public key of a recipient can only be decrypted using the private key of that same recipient. The private key cannot be derived from the knowledge of the plaintext, ciphertext and public key.

Public key protocols may be used to establish a common key that is shared by a pair of correspondents. Once the common key is established, it may be used to exchange information using a symmetric key protocol.

Key establishment is the process by which two (or more) parties establish a shared secret key, called the session key. In key agreement protocols, both parties contribute information which jointly establishes the shared secret key. The number of message exchanges required to establish the shared secret key is known as the number of passes.

A key establishment protocol is said to provide key authentication if one party is assured that no other party aside from the intended second party may learn the value of the session key. Sometimes this property is called implicit key authentication.

A key establishment protocol is said to provide key confirmation if one party is assured that a specifically identified second party actually has possession of the particular session key.

Key agreement protocols are generally based on hard problems. These problems can be formulated quickly, but do not have efficient solution algorithms. Problems such as the discrete logarithm problem and integer factorization fall into this category.

However, advances in science and technology have made computing increasingly efficient and powerful. In response, argument complexity is constantly increasing to make attempts at solving cryptographic problems even more difficult. Key agreement protocols have also increasingly relied on longer private keys, making key agreement and authentication much slower and more computationally intensive.

One of the most commonly known methods of key agreement and confirmation is Diffie-Hellman Key Agreement Protocol with Key Confirmation (the Diffie-Hellman protocol). This method allows two parties to combine information to establish a shared secret for the duration of a session. The Diffie-Hellman protocol can be implemented practically in any group in which both the discrete logarithm problem is hard and the group operation is efficient. One example of such a group is the elliptic curve cyclic group defined over the finite field $F_p$ composed of integers from 0 to p-1, where p is a prime number. The group elements are points lying on a defined elliptic curve and having coordinates that are elements of the underlying field. An elliptic curve group typically utilises an additive notation so that a k-fold group operation of a point P requires addition of the point k times and is written kP. A cryptosystem implemented using an elliptic curve group is known as an elliptic curve cryptosystem, ECC. Other groups commonly used are multiplicative groups, such as the non-zero integers in $F_p$, where p is a prime number, and the corresponding k-fold group operation is denoted $\alpha^k$, where $\alpha$ is a generator of the group.

The Diffie-Hellman protocol with key confirmation performed in an ECC requires an elliptic curve cyclic group E of order n with generating point G and identity element 0. Key establishment requires exchange of messages, while the key confirmation requires an additional set of message exchanges. Protocol messages are sent between an initiating correspondent A and a responding correspondent B as below:

a) A→B: X:=xG:
b) A←B: Y:=yG;
c) A←B: $MAC_{KB}(Y, X, ID_B)$;
d) A→B: $MAC_{KA}(X, Y, ID_A)$;

First, A selects a (secret) random integer x ∈ [1, n-1], and B selects a (secret) random integer y ∈ [1, n-1]. These secret integers are ephemeral private keys for each party. Once these integers have been selected, the ephemeral public key X:=xG is sent from A to B, and the ephemeral public key Y:=yG is sent from B to A. A shared secret for the session is then established for the two parties as a combination of the public key received from the other party and its own private ephemeral key. For party A, the shared secret is computed as $K_A$:=xY=xyG, and for party B, the shared secret is computed as $K_B$:=yX=yxG. Once the secret is agreed upon, the keys are authenticated using a Message Authentication Code (MAC), as is well known in the art. The Message Authentication Code $MAC_{KB}(Y, X, B)$ is generated by B and $MAC_{KA}(X, Y, A)$ is generated by A (where $MAC_{KB}$, and $MAC_{K:A}$, are keyed MAC algorithms well known in the art). These two MAC's are then exchanged between the parties to confirm that the identical shared secret keys have been calculated.

The shared secret may then be used directly as the key for symmetric key protocol, or, more usually, is used as an input to a key derivation function (KDF) from which the session key is derived, which is subsequently used with a symmetric-key based cryptographic scheme.

The ElGamal key agreement protocol is a one-pass variant on Diffie-Hellman key agreement. The setup is identical to the original Diffie-Hellman arrangement; however, the public key Y:=yG of B is assumed to have been authenticated and known to A a priori. A single protocol message is sent as below, which may be followed by a one-pass confirmation:

a) A→B: X:=xG;
b) A computes $K_A$:=xY;
c) A→B: $MAC_{KA}(X, Y, ID_A)$;

As stated, A begins with an authenticated copy of B's public key, Y:=yG. A then generates its private key x ∈ [1, n-1] and sends its generated public corresponding key X:=xG to B. The two parties then possess the required information to generate the shared secret, as in the Diffie-Hellman process. For party A, the shared secret is again computed as $K_A$:=xY=xyG, and for party B, the shared secret is again computed as $K_B$:=yX 32 yxG.

These methods of key agreement and confirmation are quite secure, because from the publicly exchanged messages X:=xG and Y:=yG, it is difficult to recover the original private keys x and y, or the Diffie-Hellman key K=(xy)G. To increase security of the transmitted messages, the order n of the group E must be increased accordingly. However, the computation of the ephemeral or session keys X, Y have been slowed as a result, particularly in the multiplication of the generating point G, by increasingly large scalars x and y.

Another well-known method of key agreement and confirmation is the Menezes-Qu-Vanstone. (MQV) protocol, which is based on the Diffie-Hellman scheme. Elliptic curve finite groups can also be used in this protocol, resulting in the elliptic curve MQV protocol (ECMQV). In general, ECMQV allows parties to generate a shared key K that binds a static or long term public-private key pair with an ephemeral public-private key pair. This is in contrast to the Diffie-Hellman scheme, which only uses an ephemeral public-private key pair. An implicit signature quantity for each party is produced from the party's own private static and ephemeral keys, and the corresponding party's public static and ephemeral keys. The two implicit signatures are combined to produce a shared secret between the two parties. Since each party shares a key based on components including the other party's static key, the authenticity of the other party is implicitly verified, as long as the security of the static public-private pairs has not been compromised.

The ECMQV protocol provides numerous cryptographic advantages beyond the Diffie-Hellman scheme that are well known in the art. The setup is similar to Diffie-Hellman, but contains an additional static public-private key pair for the communicating parties. The correspondent A has a public-private static key pair $(A, \alpha)$, and the correspondent B has a public-private static key pair (B, b), where $A:=\alpha G$ and B:=bG. The parties A and B are usually assumed to possess apriori the other party's public static key. As in the Diffie-Hellman scheme, an ephemeral public-private key pair (X, x) and (Y, y) are generated for the parties, where X:=xG and Y:=yG, and x ∈ [1, n-1] and y ∈ [1, n-1]. Once again, G is the generating point of the elliptic curve group. Protocol messages are sent as below:

a) A→B: X:=xG;

b) A←B: Y:=yG;

As in Diffie-Hellman, correspondent A selects an ephemeral private key x ∈ [1, n-1], and correspondent B selects an ephemeral private key y ∈ [1, n-1]. Once the ephemeral private keys have been selected, the ephemeral public key X:=xG is sent from correspondent A to correspondent B, and the ephemeral public key Y:=yG is sent from correspondent B to correspondent A. A shared secret is once again established for the two parties. However, this key is not only a combination of the message received (X or Y), and the ephemeral private key (x or y), but also includes the static public-private key pairs of the correspondents. For party A, the shared secret is computed as $K=K_A=S_A(Y+\overline{Y}B)$, where $S_A$ is the implicit signature of A defined as $S_A=(x+\overline{X}a)$ mod n. For party B, the shared key is computed as $K=K_B S_B(X+\overline{X}A)$, where $S_B$ is the implicit signature of A defined as $S_B=(y+\overline{Y}b)$ mod n. The terms $\overline{X}$ and $\overline{Y}$ are the non-zero scalars derived from ephemeral public keys X and Y by taking the first L bits of the first component of the point X and the point Y, respectively, and representing these as integers, where $$L = \left\lceil \frac{(\lfloor \log_2 n \rfloor + 1)}{2} \right\rceil.$$

There is also a one-pass variant on the ECMQV key agreement protocol. As in ElGamal, party A has apriori knowledge of the public key of party B. However, this time party A has possession of the public static key for B. The setup is similar to the ECMQV arrangement described above: however, private-public static key pair $(\alpha, A)$ for party A, and the ephemeral private-public key pair (y, Y) for party B are not used. A single protocol message is sent as below:

a) A→B: X:=xG;

This protocol assumes that party A begins with an authenticated copy of B's public static key, B:=bG. Party A then generates its private session key x ∈ [1, n-1] and sends its public key X:=xG to party B. The two parties then possess the required information to generate the shared secret, similar to the ElGamal protocol. However, party B is implicitly authenticated on the basis of the public portion of static key pair (B, b). For party A, the shared key is computed as $K=K_A:=S_A(B+\overline{B}B)$, where $S_A:=(x+\overline{X}\alpha)$ mod n. For party B, the shared key is computed as $K=K_B:=S_B(X+\overline{X}A)$, where $S_B:=(b+\overline{B}b)$ mod n. Since party A contributes both ephemeral and static keys, implicit key authentication from party A to party B is provided (as also evidenced by the formula $K=K_B:=S_B(X+\overline{X}A)$). The equivalence of the shared secret for the two parties $K=K_A=K_B$ can again be shown by the expansion of terms.

In each of the above protocols, computation of the shared secret requires the multiplication of a point by scalars, referred to a point multiplication. Point multiplication typically dominates the execution time of elliptic curve cryptosystems, and the execution time increases as the order n of the group E increases.

BRIEF DESCRIPTION

The following shows different embodiments of key agreement protocols by way of example only with reference to the appended drawings wherein:

FIG. 7 is a representation similar to FIG. 6 of the flow of information in implementing an ECMQV protocol, and.

DETAILED DESCRIPTION

In the embodiments below, a scaling factor is applied to the private key to subdivide the private key into two components, each having a bit string length less than that of the private key. The computation of the shared secret may then take advantage of efficient techniques for computing point multiplications.

Figure 1:
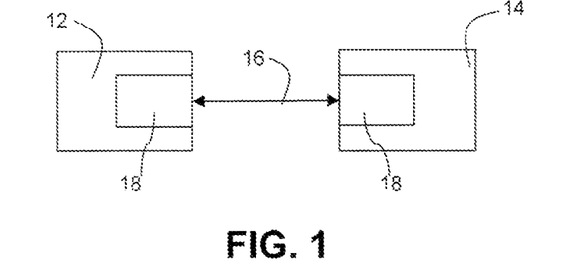
FIG. 1 is a schematic representation of a data communication system.

Referring to FIG. 1, a data communication system 10 includes a pair of correspondents 12, 14 connected by a communication link 16. The correspondents 12, 14 are computing devices, such as a personal computer, personal digital assistant, smart phone, cellular phone, ATM, Point-of-Sale device, server, entertainment system component, or other such device having a computing capability and provided to exchange digital information with other correspondents. The communication link 16 may be a telephone link, wireless or landline, local area network (LAN), RF link, or other such link provided to transfer information between the correspondents. Although shown for illustrative purposes as direct connection between correspondents 12, 14, it will be appreciated that the communication link 16 may be part of a more extensive network and that the link may be routed through multiple correspondents in passing from correspondent 12 to correspondent 14.

Figure 2:
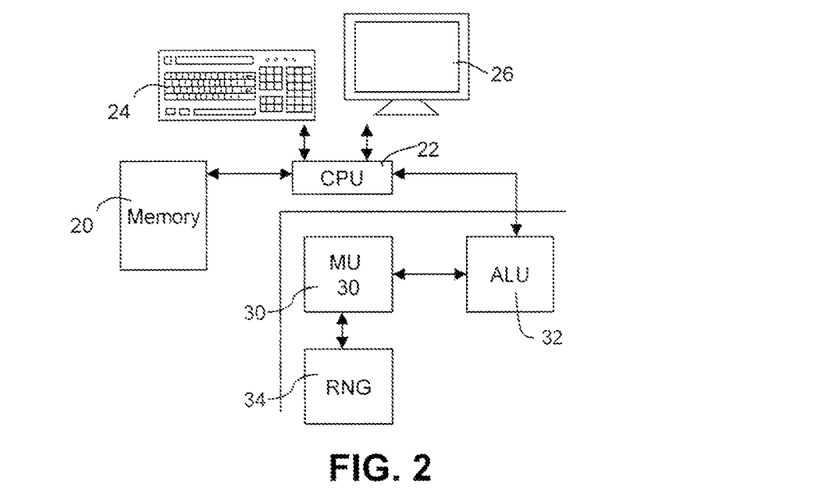
FIG. 2 is a representation of a cryptographic unit used in the system of FIG. 1.

Each of the correspondents 12, 14 is similar in operation when communicating over the link 16 and therefore only one will be described in detail. Referring therefore to FIG. 2, correspondent 12 includes a cryptographic unit 18 that communicates with a memory 20 and a processor 22. The correspondent may also include a data input unit 24, such as a keypad or card reader, and a display device, 26, depending on the intended purpose of the correspondent 12.

The cryptographic unit 18 is provided to manage secure communications between the correspondents 12, 14 over the communication link 16. The cryptographic unit 18 includes a secure memory 30, which may be part of the memory 20 or a separate memory module, and an arithmetic logic unit (ALU), 32, that operates under the control of the processor 22 to perform arithmetic operations necessary to implement a chosen cryptographic protocol. The processor 22 includes one or more instruction sets to implement respective protocols.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can he used to store the desired information and which can be accessed by an application, module, or both. Any such computer storage media may be part of the cryptographic unit or accessible or connectable thereto. Any application or module herein described may be implemented using computer readable/ executable instructions that may be stored or otherwise held by such computer readable media.

The memory 30 stores the parameters of the cryptosystem implemented by the cryptographic unit 18. In the present example, the cryptosystem is a public key elliptic curve cryptosystem in which cryptographic protocols are implemented based on the intractability of the discrete log problem in an elliptic curve group defined over a finite field. The memory 30 therefore stores the parameters of the curve, such as the generator point G and the order, n, of the elliptic curve group E. In the present embodiment, the system parameters also include correspondents 12,14 a common scaling factor t which is a value less than n. Typically, the value of t is of the order $\sqrt{n}$, i.e. the length of the bit string representing t is approximately half the length of that of representing n. It is appreciated that the examples provided herein refer to an elliptic curve group E, but the same principles could also apply to other groups, such as those for which the discrete logarithm problem is known to be hard to solve (e.g. in prime order subgroups of $Z_p^*$, where p is a prime).

The cryptographic unit 18 also includes a random number generator 34, whose output is provided to memory 30 for use by the ALU 32. The memory 30 also stores securely an ephemeral private key x that is a bit string derived from the output of the random number generator 34.

Figure 3:
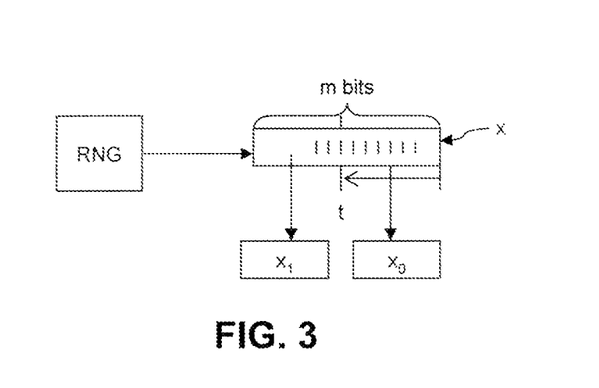
FIG. 3 is a representation of a bit string representing a private key used in the data communication system of FIG. 1.

As shown in FIG. 3, the output of the RNG 34, used as the private key x, is m bits long. Here, m is the bit size of the curve and is approximately equal to $\log_2 n$, where n is the order of the group E. The scaling factor t is used to subdivide the representation of x into two scalars $x_o$, $x_1$, where $x_0$ is the remainder when x is divided by the scaling factor t and where $x = x_o + x_1 t$. The strings representing the scalars $x_i$ and $x_0$ are stored in the memory 30, together with the value of the scaling factor t.

A session public key X corresponding to the session private key x is generated in the ALU 32 by performing an x-fold addition of the point G so that $X := xG$. This value is stored in memory 30. The ALU 32 also computes a supplementary session public key $X_1 := tX$.

The memory 30 of the correspondent 14 will similarly have a session private key, y; a corresponding session public key Y, where $Y := yG$; a pair of scalars $y_0$, $y_1$, so that $y = y_0 + y_1 t$: and a supplementary public key $Y_1 := tY$.

To establish a common secret K at the correspondent 12 and correspondent 14, a Diffie-Hellman protocol is implemented by each of the cryptographic units 18. The key agreement may be implemented using the integer t and requires exchange of messages, while the key confirmation requires an additional set of message exchanges.

Figure 4:
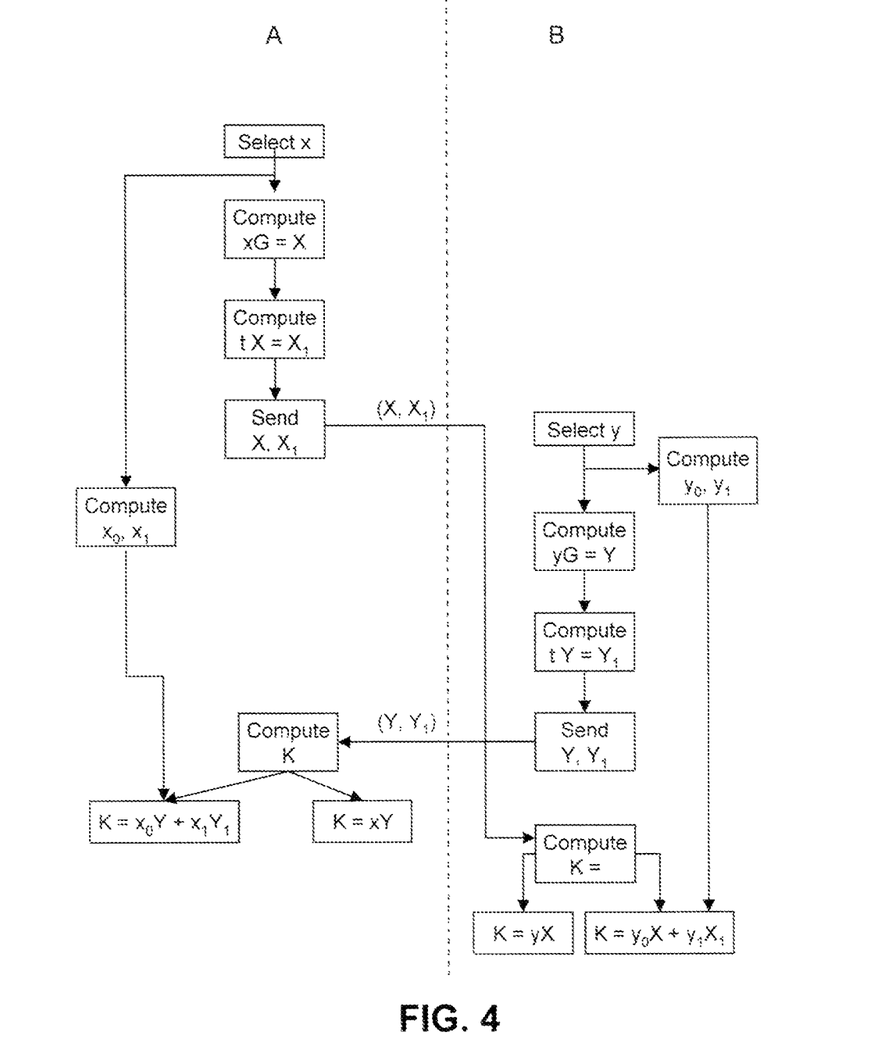
FIG. 4 is a representation of the information flow between a pair of correspondents in the data communication system of FIG. 1 in implementing a Diffie-Hellman key agreement protocol.

Protocol messages are sent as below as depicted in FIG. 4 where A denotes the correspondent initiating the exchange and B denotes the correspondent responding to the exchange.

a) A→B: $X := xG$, $X_1 := tX$:
b) A←B: $Y := yG$, $Y_1 := tY$;
c) A←B: $MAC_{KB}(Y, X, B)$;
d) A→B: $MAC_{KA}(X, Y, A)$;

First, correspondent 12 selects the ephemeral private key $x \in [1, n-1]$, and computes ephemeral public keys $X := xG$ and $X_1 := tX$. The computation is performed in the ALU 32 using point multiplication algorithms and the hit strings representing x and t respectively. Suitable algorithms are well known in the art and described at section 3.3 of the "Guide to Elliptic Curve Cryptography" and so need not be described in further detail. The session public keys X and $X_1$ are then sent from correspondent A to correspondent. B.

Correspondent B generates a random private key $y \in [1, n-1]$ using the RNG 34 of correspondent 14, and computes ephemeral public keys $Y := yG$ and $Y_1 := tY$, Y and $Y_1$ are sent from correspondent B to correspondent A.

Correspondent A also applies the scaling factor t to subdivide the integer x into a pair of scalars $x_0$ and $x_1$, such that $x = x_0 + x_1 t$. B similarly obtains a pair of scalars $y_0$ and $y_1$, such that $y = y_0 + y_1 t$.

The protocol requires correspondent A 12 to compute a shared secret K:=xY and correspondent A 12 may do this using the value of Y received from correspondent B 14. This requires an m bit point multiplication. However, more efficient computation of K may be obtained by using the points Y, $Y_1$ received from correspondent B 14 and algorithms for implementing simultaneous point multiplication. The shared secret K:=xY=$(x_0+x_1 t)$Y=$x_0$ Y+$x_1 Y_1$.

Thus the shared secret K is represented as the sum of two point multiplications, each of which involves a scalar represented by a bit string whose length is approximately half the length of the bit string representing n.

Similarly, correspondent B 14 may compute the shared secret K=yX using point multiplication or may take advantage of the value $X_1$ to compute K:=$y_0 X+y_1 X_1$.

The shared secret K may therefore be represented as the scalar multiplication of two points, X and $X_1$ or Y and $Y_1$, which may be computed as follows.

To compute the point multiplications $x_0 Y$ and $x_1 Y_1$, the ALU 32 may perform each point multiplication and add the resulting points together to obtain the key K. The scalars $x_0$, $x_1$ are approximately half the length of the bit string representing n so that each computation is less than the computation of xY. However, the total computation remains Improvements in the computational efficiency may be obtained using selected techniques as described at section 3 of the "Guide to Elliptic Curve Cryptography" by Hankerson, Menezes and Vanstone (published by Springer-Verlag), including non-adjacent forms (NAF), windowing and NAF, interleaving, windowing, combing, and precomputation of values used in the computation.

Preferably, however, the computation of the shared secret K may take advantage of the efficiencies available by using simultaneous point multiplication, described at section 3.3.3. of the above reference.

Figure 5:
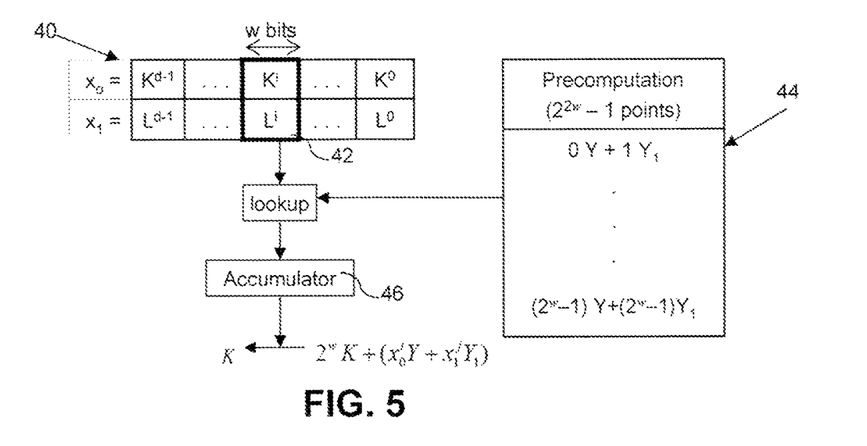
FIG. 5 is a representation of the implementation of a simultaneous point multiplication by a cryptographic unit of FIG. 2.

As shown in FIG. 5, the bit strings representing scalars $x_0$ and $x_1$ are written in memory 30 as a matrix 40. A window 42 of width w bits is selected and a table 44 of the coordinates of the points corresponding to $iY+jY_1$ for $0 \le i, j < 2^w$ is precomputed and stored in the memory 30. The table 44 therefore has each value of $iY+jY_1$ from, $0Y+0Y_1$ up to $(2^w-1)Y+(2^w-1)Y_1$.

The matrix 40 is examined by the window 42 to obtain the w bits of $x_0$ and the w bits of $x_1$ within the window. The corresponding value from the table 44 is obtained and stored in accumulator 46.

The window 42 is shifted to the next w bits and the contents of the accumulator doubled w times. The coordinates of the point form from the table 44 of the bits within the window 42 is added to the point represented by the current value in the accumulator using point addition in the ALU 32 and the result returned to the accumulator 46. These steps are repeated until the entire bit string representing $x_0$ and $x_1$ have been examined. At this time, the contents of the accumulator represents the point $x_0 Y + x_1 Y_1$, which is the shared secret K. The width of the window w may be a single bit so that the table 44 contains 3 values, Y, $Y_1$ and Y+$Y_1$. If the window w is two bits wide, then table 44 contains 15 values.

Once the shared secret is agreed upon, the shared secret is authenticated using a keyed. Message Authentication Code (MAC). The Message Authentication Code $MAC_{KB}$ (Y, X B) is generated by B and sent to A. A will then check the MAC received against its own generated MAC $MAC_{KA}$(Y, X, B). Similarly, $MAC_{KA}$(X, Y, A) is generated by correspondent A and sent to correspondent B to verify against $MAC_{KB}$(X, Y, A). Once these checks are performed, it is then confirmed that the identical shared secrets have been calculated. The shared secret is then either used directly as a key in a data exchange between the correspondents 12, 14 or may be processed by a KDF function to obtain a shared key.

In the above embodiment, the selected values of t are part of the system parameters and are known by the sender and recipient. They will typically be the same value. However, different values of t may be used by each correspondent and that value $t_A$ or $t_B$ would be incorporated in the messages exchanged between correspondent A and correspondent B. The generation of the integers $x_0$, $x_1$ and $y_0$, $y_1$ would then be performed respectively upon receipt of the value of $t_A$ by correspondent B and $t_B$ by correspondent A.

As an example embodiment, if a scaling factor $t_A$ is associated with correspondent A and a different scaling factor $t_B$ were associated with correspondent B, then correspondent B would compute $t_B Y := Y_1$ and send Y and $Y_1$ (i.e. $t_B Y$) to correspondent A. Correspondent A would then compute the scalars $x_0$, $x_1$ such that $x = x_0 + x_1 t_B$. The secret value K is then computed according to $x_0 Y + x_1 Y_1$.

Conversely, correspondent A would compute $t_A X := X_1$ and send X and $X_1$ (i.e. $t_A X$) to correspondent B. Upon receipt, correspondent B would then compute the scalars $y_0$, $y_1$ such that $y = y_0 + y_1 t_A$. The secret value K is then computed according to $y_0 X + y_1 X_1$.

It will also be noted that the supplementary public keys $X_1$, $Y_1$ may be used by only one correspondent, and the shared secrets computed by each correspondent will still be the same. That is, correspondent A 12 may compute K:=xY while correspondent 14 may compute K:=$y_o X + y_1 X_1$.

Similarly, it will be noted that the authentication of the shared secret uses the session public keys X, Y, rather than the supplementary public keys $X_1$, Y, to maintain conformity with established protocols.

Figure 6:
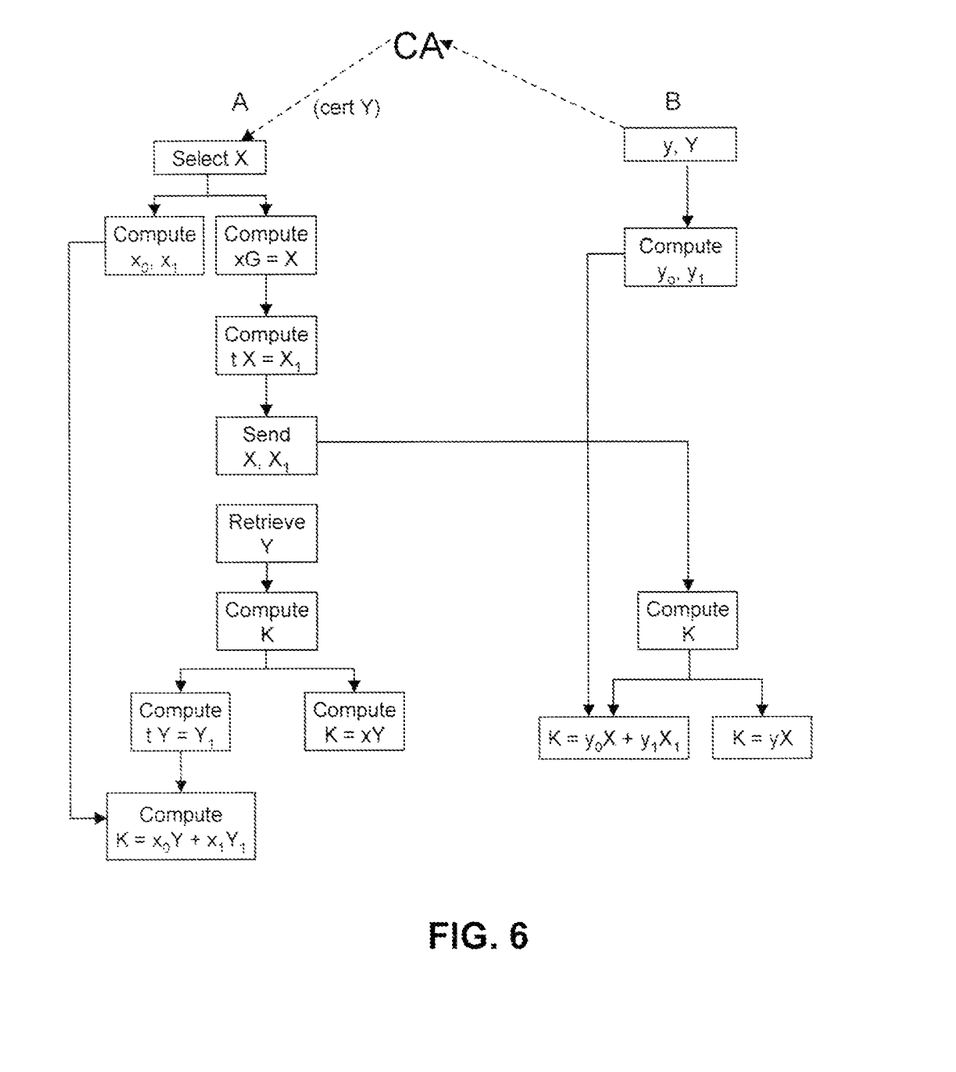
FIG. 6 is a representation similar to FIG. 4, the flow of information is implementing an ElGamal key agreement protocol.

Another embodiment is shown in FIG. 6 and is a modification of the ElGamal key agreement protocol, which, is a one-pass variant on Diffie-Hellman key agreement.

The setup is identical to a Diffie-Hellman arrangement; however, the public key Y:=yG of correspondent B is assumed to have been authenticated by a certifying authority CA and a priori known to correspondent A. A single protocol message is sent as below, which may be followed by a two-pass confirmation:

a) A→B: X:=xG, $X_1$:=tX:

b) A→B: $MAC_{KA}$(X, Y, $ID_A$).

Correspondent A begins with an authenticated copy of correspondent B's ephemeral public key, Y:=yG. A then generates its ephemeral private key x ∈ [1, n-1] and sends its corresponding generated ephemeral public key X:=xG to correspondent B. It also sends the supplementary public key $X_1$:=tX. The two parties then possess the required information to generate the shared secret, as in the Diffie-Hellman process. For correspondent A, the shared key is again computed as $K_A$:=xY=xyG, and for correspondent. B, the shared key is again computed as $K_B$:=yX=yxG.

Alternatively, correspondent B may compute the values $y_o$, $y_1$ such that $y = y_o + y_1 t$, and compute $K_B = y_o X + y_1 X_1$ as described above.

Correspondent A may also take advantage of the simultaneous point multiplication by computing tY from the authenticated copy of B's public session key Y and obtaining $x_o$ and $x_1$ such that $x = x_o + x_1 t$. The shared secret may then be computed as K:=$x_o Y + x_1 Y_1$.

As a further alternative, the certificate of correspondent B's public key may include the supplementary public key $Y_1$:=tY where the value of t is a system parameter, or may contain both $t_B$ and $Y_1$ where the value of $t_B$ varies.

Figure 7:
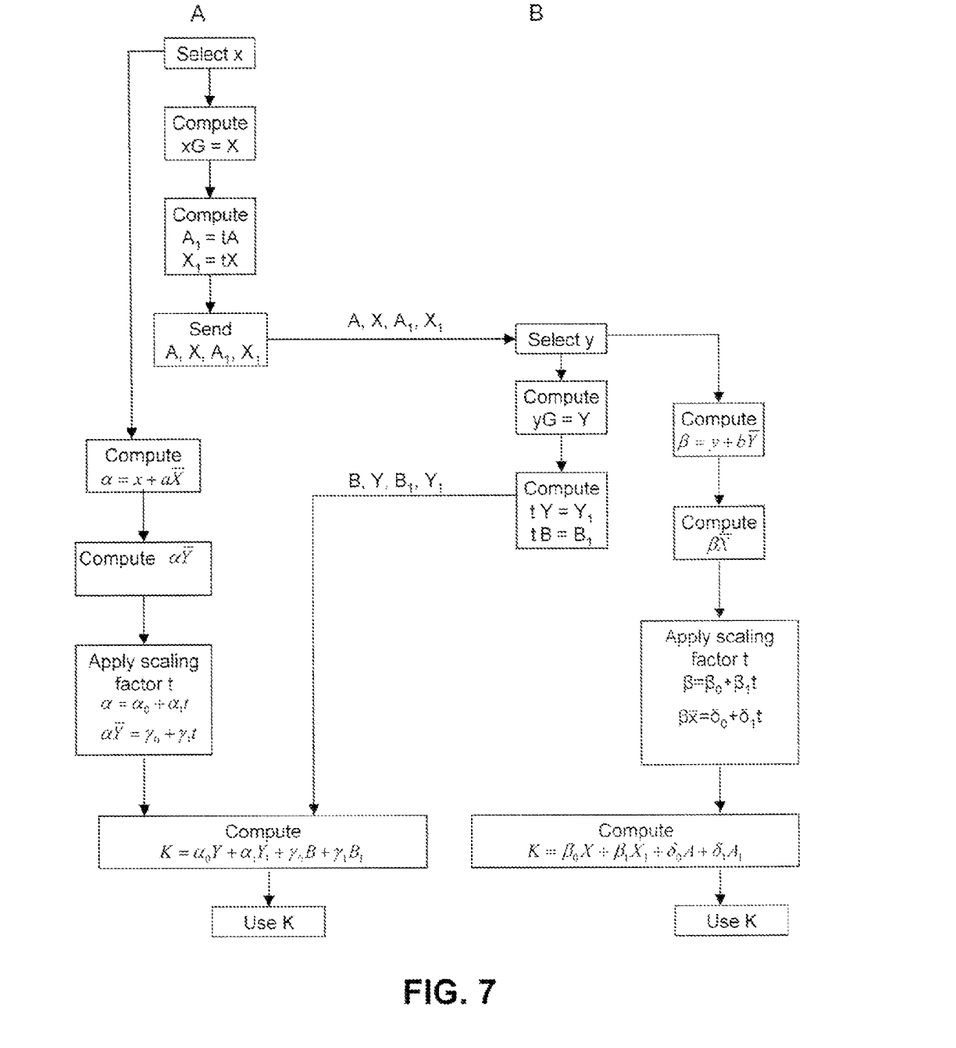

A further embodiment is shown in FIG. 7, which depicts the implementation of an ECMQV key agreement protocol. The system shown in FIGS. 1 and 2 is used to implement the protocol of FIG. 7 with processor 22 implementing the instruction set to perform the steps of that protocol.

The ECMQV key agreement protocol produces a shared secret K of the form $$K := (x + a\overline{X})(Y + \overline{Y}B)$$

and $$K := (y + b\overline{Y})(X + \overline{X}A).$$

B is a point used as a static or long term public key so that B:=bG.

The shared secret K computed by correspondent A may be computed as a linear combination of two points Y and B as K may be computed as $\alpha Y + \alpha \overline{Y}B$, where $\alpha$ equals $(x+a\overline{X})$. Similarly, the shared secret computed by correspondent B is $(y+b\overline{Y})(X+\overline{X}A)$, or $(\beta X+\beta \overline{X}A)$, where $\beta: = y+\overline{Y}b$. Therefore each of the correspondents 12, 14 may compute the scalars and use the simultaneous point multiplication algorithm described above. Each scalar however will be m bits long.

To facilitate the computation, a scaling factor t is applied to each of the scalars $\alpha$, $\alpha \overline{Y}$, $\beta$, $\beta \overline{X}$. Accordingly, for correspondent A, the pair of scalars $\alpha_o$, $\alpha_1$ are computed such that $\alpha = \alpha_o + \alpha_1 t$ where t is a scaling factor and where $\alpha = (x+a\overline{X})$. Another pair of scalars $\gamma_o$, $\gamma_1$ are computed such that $\gamma = \gamma_o + \gamma_1 t$ and $\gamma = \alpha \overline{Y}$.

Similarly, for correspondent B, the pair of scalars $\beta_o$, $\beta_1$ are computed such that $\beta = \beta_o + \beta_1 t$ where t is a scaling factor and where $\beta = y + \overline{Y}b$. Another pair of scalars $\delta_o$, $\delta_1$ are computed such that. $\delta = \delta_o + \delta_1 t$ and $\delta = \beta \overline{X}$.

Using this notation, the shared secret K computed by A is:

$$(\alpha_o + \alpha_1 t)Y + (\gamma_o + \gamma_1 t) B, \text{ or}$$

$$\alpha_o Y + \alpha_1 Y_1 + \gamma_o B + \gamma_1 B_1,$$

where the supplemental ephemeral public key $Y_1$ is equal to tY and the supplemental static public key $B_1$ is equal to tB.

The computation of K is therefore a four-fold linear combination of point multiplies, each scalar being represented by a bit string whose length is approximately half the length of the hit string representing the order n.

Similarly, the shared secret K computed by B, is:

$$\beta_o X + \beta_1 X_1 + \delta_o A + \delta_1 A_1,$$

where $X_1 := tX$ and $A_1 := tA$.

Accordingly, to compute the shared secret K in accordance with the ECMQV protocol, party A sends to party B the ephemeral public key X and static public key A. Party A may also send supplementary public keys $X_1$ and $A_1$, so that party B can use the four-fold linear combination described above'to accelerate computation of the shared secret value K.

Similarly, party B sends to party A, the ephemeral public key Y and static public key B, together with supplementary public keys $Y_1$ and $B_1$ if required.

Figure 8:
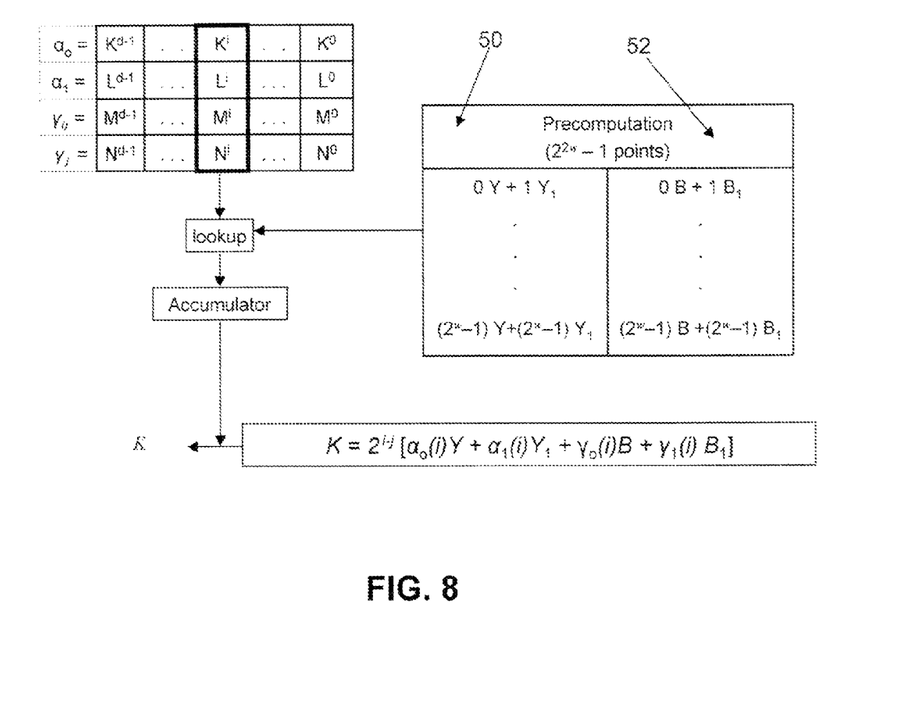
FIG. 8 is a representation of the implementation of a simultaneous point multiplication by a cryptographic unit of FIG. 2 in implementing the protocol of FIG. 7.

The ALU establishes tables of pre-computed values of the addition of x, $x_1$, A and $A_1$ for values from 0 to $2^w-1$ and performs a simultaneous multiple point multiplication to obtain $\beta_o X + \beta_1 X_1 + \delta_o A + \delta_1 A_1$.

To implement the simultaneous multiple point multiplication, the integers $(\alpha_o, \alpha_1, \gamma_o, \gamma 1)$ and $(\beta_o, \beta_1, \gamma_o, \gamma_1)$ are converted to a joint sparse form (JSF) as described at Algorithm 3.50 of the above-referenced "Guide to Elliptic Curve Cryptography".

The scalars $\alpha_o$, $\alpha_1$, $\gamma_o$, $\gamma_1$ in JSF are arranged in a "4 by t" matrix and examined by a window of width w.

A pair of precomputed tables 50, 52 representing $iY+jY_1$ and $iB+jB_1$ respectively (where $0 \leq i, j < 2^w$) are generated and stored in the memory 30.

[0010.1] The bits representing $\alpha_o$ and $\alpha_1$ within the window are used to extract a corresponding value for the table 50 for $iY+jY_1$. Similarly, the bits representing $\gamma_o$ $\gamma_1$ within the window are used to extract a corresponding value for the table 52 for $iB+jB_1$.

The two extracted values are points which are added to the accumulator using point addition. The result is doubled and the next window examined to obtain a further pair of values from respective table 50, 52. This continues until the entire matrix has been examined. The result in the accumulation is the value K as $$K_j = \sum_{i=j}^{1/2} 2^{i-j}([\alpha_o(i)Y + \alpha_1(i)Y_1] + [\gamma_o(i)B + \gamma_1(i)B_1]),$$

where i is the position of the window on the matrix.

Each of the parties A and B computes a value corresponding to K, and authenticates the value using an exchange of MAC's as described above.

It will be seen therefore that advantage is taken of a scaling factor t to improve the efficiency of the computation of the shared secret K. The computation of the shared key K is an online computation and may be more time sensitive than the computation of the supplementary public key tX, tY that can be performed offline. The supplementary public keys are computed for fixed base points so that scalar multiplication can be performed more efficiently, e.g. by using precomputed tables.

Therefore, although the supplementary public keys entail additional computations, the online computations can be performed more efficiently.

Although the implementations above have described in considerable detail the application to certain preferred protocols, it will be appreciated that similar use of a scaling factor t may be applied to other key agreement protocols where scalar point computations are required.

What we claim is:

1. A method of obtaining a secret value for use in a cryptographic operation, the secret value combining a private key, x, of one computing device with a public key, Y, of another computing device to obtain a secret value xY, the method comprising:
   the one computing device computing a pair of scalars $x_0$, $x_1$, the private key x related to the pair of scalars by $x = x_0 + x_1 t$ where t is a scaling factor;
   the one computing device receiving a supplementary public key tY;
   the one computing device combining the scalars and the public keys to compute the secret value xY as a linear combination of the scalars and the public keys;
   the one computing device utilising the secret value as a key in a cryptographic operation; and
   wherein the linear combination is computed using simultaneous multiple point multiplication comprising:
   writing the scalars $x_0$ and $x_1$ as a matrix;
   selecting a window of width w bits;
   precomputing values corresponding to $iY+j(tY)$, wherein $0 < i, j < 2^w$, and storing the precomputed values on a memory of the one computing device;
   obtaining w bits of the scalar $x_0$ and w bits of the scalar $x_1$ from the matrix as examined by the window;

retrieving from the memory the precomputed values corresponding to the w bits of the scalar $x_0$ and the w bits of the scalar $x_1$; and storing the retrieved precomputed values in an accumulator on the computing device.

2. The method of claim 1 wherein the linear combination of the scalars and public keys comprises $x_0 Y + x_1 (tY)$.

3. The method of claim 1 wherein the scaling factor is a value less than n, and wherein n is the order of an elliptic curve group used to compute the public key Y.

4. The method of claim 3 wherein the scaling factor is of the order of $\sqrt{n}$.

5. The method of claim 1 wherein the scaling factor is known to both the one computing device and the other computing device.

6. The method of claim 1 wherein the scalar $x_0$ is the remainder when the private key x is divided by the scaling factor t.

7. The method of claim 1 wherein the linear combination of the scalars and the public keys is computed using at least one of: non adjacent forms (NAF), windowing, interleaving, combing, simultaneous multiple point multiplication, and precomputation of values.

8. The method of claim 1 wherein the scaling factor is associated with the other computing device and a different scaling factor is associated with the one computing device.

9. The method of claim 8 wherein the scaling factor and the different scaling factor are incorporated into one or more messages exchanged between the one computing device and the other computing device.

10. The method of claim 1 wherein the one computing device obtains the supplementary public key from a certificate of the public key Y.

11. The method of claim 10 wherein the certificate further comprises the scaling factor.

12. A computing device comprising:
a cryptographic unit; and
a memory;
wherein the computing device is configured to communicate with another computing device; and
wherein the computing device stores computer readable instructions to obtain a secret value for use in a cryptographic operation, the secret value combining a private key, x, of the computing device with a public key, Y, of the other computing device to obtain a secret value xY; and
wherein the computer readable instructions, when executed by the computing device, cause the computing device to at least:
compute a pair of scalars $x_0$, $x_1$, the private key x related to the pair of scalars by $x = x_0 + x_1 t$ where t is a scaling factor;
receive a supplementary public key tY;
combine the scalars and the public keys to compute the secret value xY as a linear combination of the scalars and the public keys; and
utilize the secret value as a key in a cryptographic operation performed by the computing device; and
wherein the linear combination is computed using simultaneous multiple point multiplication and the computer readable instructions further cause the computing device to at least:
write the scalars $x_0$ and $x_1$ as a matrix;
select a window of width w bits;
precompute values corresponding to $iY + j(tY)$, wherein $0 \le i, j < 2^w$, and storing the precomputed values on a memory of the one computing device;
obtain w bits of the scalar $x_0$ and w bits of the scalar $x_1$ from the matrix as examined by the window;
retrieve from the memory the precomputed values corresponding to the w bits of the scalar $x_0$ and the w bits of the scalar $x_1$; and
store the retrieved precomputed values in an accumulator on the computing device.

13. A method of obtaining a secret value for use in a cryptographic operation, the secret value combining,
from one computing device, a private static key a, a private ephemeral key x, and a representation $\overline{X}$ of an ephemeral public key X, the ephemeral public key corresponding to the ephemeral private key,
with, from another computing device, an ephemeral public key Y, a representation $\overline{Y}$ of the ephemeral public key Y, and a static public key B,
to obtain a secret value $(x + a\overline{X})(Y + \overline{Y}B)$, the method comprising:
the one computing device computing a pair of scalars $\alpha_0$, $\alpha_1$ using a value $\alpha$ computable by $\alpha = (x + a\overline{X})$, the value a related to the pair of scalars $\alpha_0, \alpha_1$ by $\alpha = \alpha_0 + \alpha_1 t$ where t is a scaling factor;
the one computing device computing another pair of scalars $\gamma_0, \gamma_1$ using a value $\gamma$ computable by $\gamma = \alpha \overline{Y}$, the value $\alpha$ related to the pair of scalars $\gamma_0, \gamma_1$ by $\gamma = \gamma_0 + \gamma_1 t$;
the one computing device receiving a supplementary ephemeral public key tY and a supplementary static public key tB;
the one computing device combining the scalars and the public keys to compute the secret value $(x + a\overline{X})(Y + \overline{Y}B)$ as a linear combination of the scalars and the public keys; and
the one computing device utilising the secret value as the key in the cryptographic operation.

14. The method of claim 13 wherein the linear combination of the scalars and public keys comprising $\alpha_0 Y + \alpha_1 (tY) + \gamma_0 B + \gamma_1 (tB)$.

15. The method of claim 13 wherein the scaling factor is a value less than n, and wherein n is the order of an elliptic curve group used to compute the ephemeral public key Y.

16. The method of claim 15 wherein the scaling factor is of the order of $\sqrt{n}$.

17. The method of claim 13 wherein the scaling factor is known to both the one computing device and the other computing device.

18. The method of claim 13 wherein the linear combination of the scalars and the public keys is computed using at least one of: non-adjacent forms (NAF), windowing, interleaving, combing, simultaneous multiple point multiplication, and precomputation of values.

19. The method of claim 13 wherein the linear combination is computed using simultaneous point multiplication comprising:
arranging the scalars $\alpha_0, \alpha_1, \gamma_0, \gamma_1$ into a matrix;
selecting a window of width w bits;
precomputing values corresponding to $iY + j(tY)$ and corresponding to $iB + j(tB)$ wherein $0 \le i, j < 2^w$, and storing the precomputed values on a memory of the one computing device;
obtaining w bits of each of the scalars $\alpha_0, \alpha_1, \gamma_o, \gamma_1$ from the matrix as examined by the window;
retrieving from the memory the precomputed values corresponding to the w bits of each of the scalars $\alpha_0, \alpha_1, \gamma_o, \gamma_1$; and
storing the retrieved precomputed values in an accumulator on the computing device.

20. The method of claim 13 wherein the scaling factor is associated with the other computing device and a different scaling factor is associated with the one computing device.

21. The method of claim 20 wherein the scaling factor and the different scaling factor are incorporated into one or more messages exchanged between the one computing device and the other computing device.

22. The method of claim 13 wherein the one computing device obtains the supplementary public key from a certificate of the ephemeral public key Y.

23. The method of claim 22 wherein the certificate further comprises the scaling factor.

24. A computing device comprising:
a cryptographic unit; and
a memory;
wherein the computing device is configured to communicate with another computing device; and
wherein the computing device stores computer readable instructions to obtain a secret value for use in a cryptographic operation, the secret value combining,
from the computing device, a private static key a, an ephemeral private key x, and a representation $\overline{X}$ of an ephemeral public key X, the ephemeral public key corresponding to the ephemeral private key,
with, from another computing device, an ephemeral public key Y, a representation $\overline{Y}$ of the ephemeral public key Y, and a static public key B,
to obtain $(x+a\overline{X})(Y+\overline{Y}B)$; and
wherein the computer readable instructions, when executed by the computing device, cause the computing device to at least:
compute a pair of scalars $\alpha_0, \alpha_1$ using a value $\alpha$ computable by $\alpha=(x+a\overline{X})$, the value $\alpha$ related to the pair of scalars $\alpha_0, \alpha_1$ by $\alpha=\alpha_0+\alpha_1 t$ where t is a scaling factor;
compute another pair of scalars $\gamma_0, \gamma_1$ using a value $\gamma$ computable by $\gamma=\alpha a\overline{Y}$, the value $\gamma$ related to the pair of scalars $\gamma_0, \gamma_1$ by $\gamma=\gamma_0+\gamma_1 t$;
receive a supplementary ephemeral public key tY and a supplementary static public key tB;
combine the scalars and the public keys to compute the secret value $(x+a\overline{X})(Y+\overline{Y}B)$ as a linear combination of the scalars and the public keys; and
utilize the secret value as the key in the cryptographic operation performed by the computing device.

* * * * *